US008463753B2

United States Patent
Gokhale et al.

(10) Patent No.: US 8,463,753 B2
(45) Date of Patent: *Jun. 11, 2013

(54) SYSTEM AND METHOD FOR EXTENDED MEDIA RETENTION

(75) Inventors: Parag Gokhale, Marlboro, NJ (US); Yanhui Lu, Acton, MA (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/532,218

(22) Filed: Jun. 25, 2012

(65) Prior Publication Data

US 2012/0265732 A1    Oct. 18, 2012

Related U.S. Application Data (63) Continuation of application No. 12/549,518, filed on Aug. 28, 2009, now Pat. No. 8,209,293, which is a continuation of application No. 10/818,750, filed on Apr. 5, 2004, now Pat. No. 7,596,586.

(60) Provisional application No. 60/460,235, filed on Apr. 3, 2003.

(51) Int. Cl.
*G06F 7/00* (2006.01)
*G06F 17/00* (2006.01)

(52) U.S. Cl.
USPC .......................................... 707/663; 707/640

(58) Field of Classification Search
USPC ................................................ 707/663, 640
See application file for complete search history.

(56) References Cited

U.S. PATENT DOCUMENTS

| | | | |
|---|---|---|---|
| 4,686,620 | A | 8/1987 | Ng |
| 4,995,035 | A | 2/1991 | Cole et al. |
| 5,005,122 | A | 4/1991 | Griffin et al. |
| 5,093,912 | A | 3/1992 | Dong et al. |
| 5,133,065 | A | 7/1992 | Cheffetz et al. |
| 5,193,154 | A | 3/1993 | Kitajima et al. |
| 5,212,772 | A | 5/1993 | Masters |
| 5,226,157 | A | 7/1993 | Nakano et al. |
| 5,239,647 | A | 8/1993 | Anglin et al. |
| 5,241,164 | A | 8/1993 | Pavlidis et al. |
| 5,241,668 | A | 8/1993 | Eastridge et al. |

(Continued)

FOREIGN PATENT DOCUMENTS

| | | |
|---|---|---|
| EP | 0259912 A1 | 3/1988 |
| EP | 0405926 A2 | 1/1991 |

(Continued)

OTHER PUBLICATIONS

U.S. Appl. No. 09/609,977, filed Jul. 5, 2000, Prahlad.

(Continued)

*Primary Examiner* — Shew-Fen Lin
(74) *Attorney, Agent, or Firm* — Perkins Coie LLP (57) ABSTRACT

The present invention provides systems and methods for extending media retention. Methods are provided in which a set of aging preferences are obtained. Data elements of a data set stored on storage media are evaluated against the aging preferences to determine whether each of the data elements satisfy the aging preferences. Each of the data elements that is determined to satisfy the aging preferences is aged. Aging can include freeing a portion of storage media, previously used to store a data element, for other storage usage.

20 Claims, 3 Drawing Sheets

U.S. PATENT DOCUMENTS

| | | |
|---|---|---|
| 5,241,670 A | 8/1993 | Eastridge et al. |
| 5,265,159 A | 11/1993 | Kung |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,412,668 A | 5/1995 | Dewey |
| 5,448,724 A | 9/1995 | Hayashi |
| 5,455,926 A | 10/1995 | Keele et al. |
| 5,491,810 A | 2/1996 | Allen |
| 5,495,457 A | 2/1996 | Takagi |
| 5,495,607 A | 2/1996 | Pisello et al. |
| 5,499,364 A | 3/1996 | Klein et al. |
| 5,504,873 A | 4/1996 | Martin et al. |
| 5,506,986 A | 4/1996 | Healy |
| 5,544,345 A | 8/1996 | Carpenter et al. |
| 5,544,347 A | 8/1996 | Yanai et al. |
| 5,548,521 A | 8/1996 | Krayer et al. |
| 5,559,957 A | 9/1996 | Balk |
| 5,608,865 A * | 3/1997 | Midgely et al. ............ 714/1 |
| 5,619,644 A | 4/1997 | Crockett et al. |
| 5,638,509 A | 6/1997 | Dunphy et al. |
| 5,673,381 A | 9/1997 | Huai et al. |
| 5,677,900 A | 10/1997 | Nishida et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,815,662 A | 9/1998 | Ong |
| 5,832,522 A | 11/1998 | Blickenstaff et al. |
| 5,860,068 A | 1/1999 | Cook |
| 5,875,478 A | 2/1999 | Blumenau |
| 5,875,481 A | 2/1999 | Ashton et al. |
| 5,887,134 A | 3/1999 | Ebrahim |
| 5,893,139 A | 4/1999 | Kamiyama |
| 5,898,593 A | 4/1999 | Baca et al. |
| 5,901,327 A | 5/1999 | Ofek |
| 5,924,102 A | 7/1999 | Perks |
| 5,950,205 A | 9/1999 | Aviani, Jr. |
| 5,958,005 A | 9/1999 | Thorne et al. |
| 5,974,563 A | 10/1999 | Beeler, Jr. |
| 5,978,577 A | 11/1999 | Rierden et al. |
| 6,021,415 A | 2/2000 | Cannon et al. |
| 6,026,398 A | 2/2000 | Brown et al. |
| 6,026,414 A | 2/2000 | Anglin |
| 6,052,735 A | 4/2000 | Ulrich et al. |
| 6,076,148 A | 6/2000 | Kedem |
| 6,088,694 A | 7/2000 | Burns et al. |
| 6,094,416 A | 7/2000 | Ying |
| 6,131,095 A | 10/2000 | Low et al. |
| 6,131,099 A | 10/2000 | Johnson et al. |
| 6,131,147 A | 10/2000 | Takagi |
| 6,131,190 A | 10/2000 | Sidwell |
| 6,137,864 A | 10/2000 | Yaker |
| 6,148,412 A | 11/2000 | Cannon et al. |
| 6,154,738 A | 11/2000 | Call |
| 6,154,787 A | 11/2000 | Urevig et al. |
| 6,161,111 A | 12/2000 | Mutalik et al. |
| 6,167,402 A | 12/2000 | Yeager |
| 6,195,794 B1 | 2/2001 | Buxton |
| 6,212,512 B1 | 4/2001 | Barney et al. |
| 6,223,205 B1 | 4/2001 | Harchol-Balter et al. |
| 6,246,882 B1 | 6/2001 | Lachance |
| 6,260,069 B1 | 7/2001 | Anglin |
| 6,266,784 B1 | 7/2001 | Hsiao et al. |
| 6,269,382 B1 | 7/2001 | Cabrera et al. |
| 6,269,431 B1 | 7/2001 | Dunham |
| 6,275,953 B1 | 8/2001 | Vahalia et al. |
| 6,301,592 B1 | 10/2001 | Aoyama et al. |
| 6,304,880 B1 | 10/2001 | Kishi |
| 6,308,245 B1 | 10/2001 | Johnson et al. |
| 6,324,581 B1 | 11/2001 | Xu et al. |
| 6,328,766 B1 | 12/2001 | Long |
| 6,330,570 B1 | 12/2001 | Crighton |
| 6,330,572 B1 | 12/2001 | Sitka |
| 6,330,642 B1 | 12/2001 | Carteau |
| 6,338,006 B1 | 1/2002 | Jesionowski et al. |
| 6,343,324 B1 | 1/2002 | Hubis et al. |
| RE37,601 E | 3/2002 | Eastridge et al. |
| 6,353,878 B1 | 3/2002 | Dunham |
| 6,356,801 B1 | 3/2002 | Goodman et al. |
| 6,356,901 B1 | 3/2002 | MacLeod et al. |
| 6,366,900 B1 | 4/2002 | Hu |
| 6,374,336 B1 | 4/2002 | Peters et al. |
| 6,389,432 B1 | 5/2002 | Pothapragada et al. |
| 6,418,441 B1 | 7/2002 | Call |
| 6,418,478 B1 | 7/2002 | Ignatius et al. |
| 6,421,711 B1 | 7/2002 | Blumenau et al. |
| 6,434,682 B1 | 8/2002 | Ashton et al. |
| 6,457,017 B2 | 9/2002 | Watkins et al. |
| 6,484,166 B1 | 11/2002 | Maynard |
| 6,487,561 B1 | 11/2002 | Ofek et al. |
| 6,490,666 B1 | 12/2002 | Cabrera et al. |
| 6,496,744 B1 | 12/2002 | Cook |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,564,228 B1 | 5/2003 | O'Connor |
| 6,616,047 B2 | 9/2003 | Catan |
| 6,658,436 B2 | 12/2003 | Oshinsky et al. |
| 6,658,526 B2 | 12/2003 | Nguyen et al. |
| 6,662,281 B2 | 12/2003 | Ballard et al. |
| 6,669,832 B1 | 12/2003 | Saito et al. |
| 6,674,924 B2 | 1/2004 | Wright et al. |
| 6,721,334 B1 | 4/2004 | Ketcham |
| 6,732,293 B1 * | 5/2004 | Schneider ............ 714/15 |
| 6,757,794 B2 | 6/2004 | Cabrera et al. |
| 6,771,595 B1 | 8/2004 | Gilbert et al. |
| 6,789,161 B1 | 9/2004 | Blendermann et al. |
| 6,802,025 B1 | 10/2004 | Thomas et al. |
| 6,820,035 B1 | 11/2004 | Zahavi |
| 6,851,031 B2 | 2/2005 | Trimmer et al. |
| 6,909,356 B2 | 6/2005 | Brown et al. |
| 6,922,687 B2 | 7/2005 | Vernon |
| 6,934,879 B2 | 8/2005 | Misra et al. |
| 6,941,370 B2 | 9/2005 | Boies et al. |
| 6,950,723 B2 | 9/2005 | Gallo et al. |
| 6,968,351 B2 | 11/2005 | Butterworth |
| 6,968,479 B2 | 11/2005 | Wyatt et al. |
| 6,972,918 B2 | 12/2005 | Kokami et al. |
| 6,973,369 B2 | 12/2005 | Trimmer et al. |
| 6,973,553 B1 | 12/2005 | Archibald, Jr. et al. |
| 6,983,351 B2 | 1/2006 | Gibble et al. |
| 7,006,435 B1 | 2/2006 | Davies et al. |
| 7,010,387 B2 | 3/2006 | Lantry et al. |
| 7,012,529 B2 | 3/2006 | Sajkowsky |
| 7,034,683 B2 | 4/2006 | Ghazarian |
| 7,035,880 B1 | 4/2006 | Crescenti et al. |
| 7,058,649 B2 | 6/2006 | Ough et al. |
| 7,069,466 B2 | 6/2006 | Trimmer et al. |
| 7,082,441 B1 | 7/2006 | Zahavi et al. |
| 7,085,786 B2 | 8/2006 | Carlson et al. |
| 7,085,904 B2 | 8/2006 | Mizuno et al. |
| 7,093,089 B2 | 8/2006 | de Brebisson |
| 7,096,269 B2 | 8/2006 | Yamagami |
| 7,096,315 B2 | 8/2006 | Takeda et al. |
| 7,103,619 B1 | 9/2006 | Rajpurkar et al. |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,118,034 B2 | 10/2006 | Baldassari et al. |
| 7,120,823 B2 | 10/2006 | Foster et al. |
| 7,130,970 B2 | 10/2006 | Devassy et al. |
| 7,136,720 B2 | 11/2006 | Deckers |
| 7,146,377 B2 | 12/2006 | Nowicki et al. |
| 7,155,465 B2 | 12/2006 | Lee et al. |
| 7,155,486 B2 | 12/2006 | Aoshima et al. |

| Patent No. | Date | Inventor |
|---|---|---|
| 7,162,496 B2 | 1/2007 | Amarendran et al. |
| 7,162,604 B1 | 1/2007 | Nourmohamadian et al. |
| 7,162,693 B2 | 1/2007 | Yamanaka et al. |
| 7,191,283 B2 | 3/2007 | Amemiya et al. |
| 7,197,490 B1 | 3/2007 | English |
| 7,200,621 B2 | 4/2007 | Beck et al. |
| 7,203,944 B1 | 4/2007 | van Rietschote et al. |
| 7,209,949 B2 | 4/2007 | Mousseau et al. |
| 7,213,118 B2 | 5/2007 | Goodman et |
| 7,216,244 B2 | 5/2007 | Amano |
| 7,246,140 B2 | 7/2007 | Therrien et al. |
| 7,246,207 B2 | 7/2007 | Kottomtharayil et al. |
| 7,246,258 B2 | 7/2007 | Chen et al. |
| 7,277,246 B2 | 10/2007 | Barbian et al. |
| 7,277,953 B2 | 10/2007 | Wils et al. |
| 7,281,032 B2 | 10/2007 | Kodama |
| 7,287,047 B2 | 10/2007 | Kavuri |
| 7,293,133 B1 | 11/2007 | Colgrove et al. |
| 7,343,356 B2 | 3/2008 | Prahlad et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,379,850 B2 | 5/2008 | Sprogis et al. |
| 7,395,282 B1 | 7/2008 | Crescenti et al. |
| 7,395,387 B2 | 7/2008 | Berkowitz et al. |
| 7,401,728 B2 | 7/2008 | Markham et al. |
| 7,421,312 B2 | 9/2008 | Trossell |
| 7,434,090 B2 | 10/2008 | Hartung et al. |
| 7,447,907 B2 | 11/2008 | Hart, III et al. |
| 7,454,569 B2 | 11/2008 | Kavuri et al. |
| 7,467,167 B2 | 12/2008 | Patterson |
| 7,472,238 B1 | 12/2008 | Gokhale et al. |
| 7,500,053 B1 | 3/2009 | Kavuri et al. |
| 7,529,782 B2 | 5/2009 | Prahlad et al. |
| 7,539,702 B2 | 5/2009 | Deshmukh et al. |
| 7,539,783 B2 | 5/2009 | Kochunni et al. |
| 7,565,340 B2 | 7/2009 | Herlocker et al. |
| 7,581,011 B2 | 8/2009 | Teng |
| 7,584,227 B2 | 9/2009 | Gokhale et al. |
| 7,584,298 B2 | 9/2009 | Klinker et al. |
| 7,587,749 B2 | 9/2009 | Leser et al. |
| 7,596,586 B2 | 9/2009 | Gokhale et al. |
| 7,603,518 B2 | 10/2009 | Kottomtharayil |
| 7,627,617 B2 | 12/2009 | Kavuri et al. |
| 7,644,245 B2 | 1/2010 | Prahlad et al. |
| 7,657,666 B2 | 2/2010 | Kottomtharayil et al. |
| 7,659,820 B2 | 2/2010 | Schnee et al. |
| 7,660,812 B2 | 2/2010 | Findlay et al. |
| 7,680,843 B1 | 3/2010 | Panchbudhe et al. |
| 7,689,510 B2 | 3/2010 | Lamkin et al. |
| 7,702,659 B2 | 4/2010 | Ban et al. |
| 7,707,060 B2 | 4/2010 | Chainer et al. |
| 7,712,094 B2 | 5/2010 | Shapiro |
| 7,739,450 B2 | 6/2010 | Kottomtharayil |
| 7,748,610 B2 | 7/2010 | Bell et al. |
| 7,765,167 B2 | 7/2010 | Prahlad et al. |
| 7,765,369 B1 | 7/2010 | Prahlad et al. |
| 7,805,416 B1 | 9/2010 | Compton et al. |
| 7,809,699 B2 | 10/2010 | Passmore et al. |
| 7,809,914 B2 | 10/2010 | Kottomtharayil et al. |
| 7,818,417 B2 | 10/2010 | Ginis et al. |
| 7,822,715 B2 | 10/2010 | Petruzzo |
| 7,831,566 B2 | 11/2010 | Kavuri et al. |
| 7,840,537 B2 | 11/2010 | Gokhale et al. |
| 7,849,266 B2 | 12/2010 | Kavuri et al. |
| 7,861,011 B2 | 12/2010 | Kottomtharayil et al. |
| 7,873,802 B2 | 1/2011 | Gokhale et al. |
| 7,877,351 B2 | 1/2011 | Crescenti et al. |
| 7,877,362 B2 | 1/2011 | Gokhale et al. |
| 7,889,847 B2 | 2/2011 | Gainsboro |
| 7,890,796 B2 | 2/2011 | Pawar et al. |
| 7,904,350 B2 | 3/2011 | Ayala et al. |
| 7,917,473 B2 | 3/2011 | Kavuri et al. |
| 7,917,695 B2 | 3/2011 | Ulrich et al. |
| 7,934,071 B2 | 4/2011 | Abe et al. |
| 7,937,365 B2 | 5/2011 | Prahlad et al. |
| 7,945,810 B2 | 5/2011 | Soran et al. |
| 7,953,802 B2 | 5/2011 | Mousseau et al. |
| 7,969,306 B2 | 6/2011 | Ebert et al. |
| 7,975,061 B1 | 7/2011 | Gokhale et al. |
| 7,987,319 B2 | 7/2011 | Kottomtharayil |
| 8,051,043 B2 | 11/2011 | Young |
| 8,112,605 B2 | 2/2012 | Kavuri |
| 8,140,786 B2 | 3/2012 | Bunte et al. |
| 8,161,318 B2 | 4/2012 | D'Souza et al. |
| 8,195,800 B2 | 6/2012 | Tameshige et al. |
| 8,209,293 B2 | 6/2012 | Gokhale et al. |
| 8,219,524 B2 | 7/2012 | Gokhale |
| 8,230,066 B2 | 7/2012 | Heil |
| 8,230,171 B2 | 7/2012 | Kottomtharayil |
| 8,234,417 B2 | 7/2012 | Kottomtharayil et al. |
| 8,244,841 B2 | 8/2012 | Shaji et al. |
| 8,266,406 B2 | 9/2012 | Kavuri |
| 8,266,615 B2 | 9/2012 | Shapiro |
| 2002/0010661 A1 | 1/2002 | Waddington et al. |
| 2002/0032613 A1 | 3/2002 | Buettgenbach et al. |
| 2002/0046322 A1* | 4/2002 | Butterworth et al. ......... 711/114 |
| 2002/0049778 A1 | 4/2002 | Bell et al. |
| 2002/0069324 A1 | 6/2002 | Gerasimov et al. |
| 2002/0099854 A1* | 7/2002 | Jorgensen ...................... 709/249 |
| 2003/0055671 A1 | 3/2003 | Nassar |
| 2003/0065759 A1 | 4/2003 | Britt et al. |
| 2003/0067903 A1* | 4/2003 | Jorgensen ...................... 370/338 |
| 2003/0101155 A1 | 5/2003 | Gokhale et al. |
| 2003/0134619 A1 | 7/2003 | Phillips et al. |
| 2003/0220901 A1 | 11/2003 | Carr et al. |
| 2003/0225800 A1* | 12/2003 | Kavuri ........................... 707/204 |
| 2004/0054607 A1 | 3/2004 | Waddington et al. |
| 2004/0073677 A1 | 4/2004 | Honma et al. |
| 2004/0083202 A1 | 4/2004 | Mu et al. |
| 2004/0107199 A1 | 6/2004 | Dalrymple et al. |
| 2004/0193953 A1 | 9/2004 | Callahan et al. |
| 2005/0008163 A1 | 1/2005 | Leser et al. |
| 2005/0021524 A1 | 1/2005 | Oliver |
| 2005/0033913 A1 | 2/2005 | Kottomtharayil et al. |
| 2005/0039069 A1 | 2/2005 | Prahlad et al. |
| 2005/0102203 A1 | 5/2005 | Keong |
| 2005/0174869 A1 | 8/2005 | Kottomtharayil et al. |
| 2005/0177828 A1 | 8/2005 | Graham et al. |
| 2005/0246342 A1 | 11/2005 | Vernon |
| 2006/0004639 A1 | 1/2006 | O'Keefe |
| 2006/0004675 A1 | 1/2006 | Bennett et al. |
| 2006/0011720 A1 | 1/2006 | Call |
| 2006/0095385 A1 | 5/2006 | Atkinson et al. |
| 2006/0161879 A1 | 7/2006 | Lubrecht et al. |
| 2006/0169769 A1 | 8/2006 | Boyarsky et al. |
| 2006/0224846 A1 | 10/2006 | Amarendran et al. |
| 2006/0248165 A1 | 11/2006 | Sridhar et al. |
| 2006/0282194 A1 | 12/2006 | Schaefer et al. |
| 2006/0285172 A1 | 12/2006 | Hull et al. |
| 2007/0130105 A1 | 6/2007 | Papatla |
| 2007/0156897 A1 | 7/2007 | Lim |
| 2007/0185912 A1 | 8/2007 | Gupta et al. |
| 2007/0198722 A1 | 8/2007 | Kottomtharayil et al. |
| 2008/0243420 A1 | 10/2008 | Gokhale et al. |
| 2008/0243754 A1 | 10/2008 | Gokhale et al. |
| 2008/0243795 A1 | 10/2008 | Prahlad et al. |
| 2008/0243870 A1 | 10/2008 | Muller et al. |
| 2008/0244177 A1 | 10/2008 | Crescenti et al. |
| 2008/0249656 A1 | 10/2008 | Gokhale et al. |
| 2008/0250076 A1 | 10/2008 | Muller et al. |
| 2008/0320319 A1 | 12/2008 | Muller et al. |
| 2009/0063765 A1 | 3/2009 | Kottomtharayil et al. |
| 2009/0319534 A1 | 12/2009 | Gokhale |
| 2010/0070466 A1 | 3/2010 | Prahlad et al. |
| 2010/0070474 A1 | 3/2010 | Lad |
| 2010/0070726 A1 | 3/2010 | Ngo et al. |
| 2010/0082672 A1 | 4/2010 | Kottomtharayil et al. |
| 2010/0138393 A1 | 6/2010 | Crescenti et al. |
| 2010/0293112 A1 | 11/2010 | Prahlad et al. |
| 2011/0093672 A1 | 4/2011 | Gokhale et al. |
| 2011/0213755 A1 | 9/2011 | Kavuri et al. |
| 2011/0231852 A1 | 9/2011 | Gokhale et al. |
| 2012/0084523 A1 | 4/2012 | Littlefield et al. |
| 2012/0185657 A1 | 7/2012 | Gokhale et al. |
| 2012/0265732 A1 | 10/2012 | Gokhale et al. |
| 2012/0265936 A1 | 10/2012 | Kottomtharayil |

FOREIGN PATENT DOCUMENTS

| | | |
|---|---|---|
| EP | 0467546 A2 | 1/1992 |
| EP | 0620553 | 10/1994 |
| EP | 0774715 A1 | 5/1997 |
| EP | 0809184 A1 | 11/1997 |
| EP | 0899662 A1 | 3/1999 |
| EP | 0981090 A1 | 2/2000 |
| JP | 7254204 | 10/1995 |
| JP | 9044381 | 2/1997 |
| JP | 9081424 | 3/1997 |
| WO | WO-9513580 A1 | 5/1995 |
| WO | WO-9912098 A1 | 3/1999 |
| WO | WO-2005024573 A2 | 3/2005 |

OTHER PUBLICATIONS

U.S. Appl. No. 10/655,764, filed Sep. 7, 2005, Nourmohamadian.
U.S. Appl. No. 11/269,513, filed Nov. 7, 2005, Prahlad.
U.S. Appl. No. 13/534,070, filed Jun. 27, 2012, Kottomtharayil et al.
Allen, "Probablility, Statistics and Queuing Theory," (1978), p. 370, Col. 19, Lines 3-33, 1 page.
Armstead et al., "Implementation of a Campus-wide Distributed Mass Storage Service: The Dream vs. Reality," IEEE, 1995, pp. 190-199.
Arneson, "Mass Storage Archiving in Network Environments," Digest of Papers, Ninth IEEE Symposium on Mass Storage Systems, Oct. 31-Nov. 3, 1988, pp. 45-50, Monterey, CA.
Ashton et al., "Two Decades of policy-based storage management for the IBM mainframe computer", www.research.ibm.com, 19 pages, published Apr. 10, 2003, printed Jan. 3, 2009.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5-9, 1995, pp. 420-427, San Francisco, CA.
Campbell, C.: "Linux and Windows NT 4.0: Basic Administration—Part III" Internet Publication, [Online] Oct. 5, 2000, Retrieved from the Internet: URL: <http://linux.omnipotent.net/article.php?article_id=10933> [retrieved on Aug. 22, 2006], 6 pages.
Carrington, D.: "Backups Using the "at" Command", Internet Publication, [Online] May 4, 1999, Retrieved from the Internet: URL: <http://groups.google.de/group/microsoft.public.windowsnt.misc/browse_thread/thread/d1406a9a8391afea/48bac300a0adcc7a?lnk=st&q=&rnum=12&hl=de#48bac300a0adcc7a> [retrieved on Aug. 22, 2006].
Cook, P.: "ntbackup: eject tape at end of backup?" Internet Publication, [Online] Oct. 18, 2000, Retrieved from the Internet: URL: <http://groups.google.de/group/microsoft.public.windowsnt.misc/browse_thread/thread/8f67f0cc96df42b7/0ab1d93a6f91b511?lnk=st&q=%22ntbackup+eject%22+at&rnum=1&hl=de#0ab1d93a6f91b511> [retrieved on Aug. 22, 2006].
Eitel, "Backup and Storage Management in Distributed Heterogeneous Environments," IEEE, 1994, pp. 124-126.
Gonzalez-Seco, Jose, "A Genetic Algorithm as the Learning Procedure for Neural Networks," International Joint Conference on Neural Networks, Jun. 1992, 356 pages.
Jander, M., "Launching Storage-Area Net," Data Communications, US, McGraw Hill, NY, vol. 27, No. 4 (Mar. 21, 1998), pp. 64-72.
Jason Gait, "The Optical File Cabinet: A Random-Access File System for Write-Once Optical Disks," IEEE Computer, vol. 21, No. 6, pp. 11-22 (1988) (see in particular figure 5 in p. 15 and recitation in claim 5).
MDM: "Automatically eject tape", Internet Publication, [Online] Jun. 7, 1999, Retrieved from Internet: URL: <http://groups.google.de/group/microsoft.public.windowsnt.misc/browse_thread/thread/66537271a88cebda/2f8b1b96dfc5f102?lnk=st&q=&rnum=11&hl=de#2f8b1b96dfc5f102> [retrieved on Jun. 22, 2006].
Recycle Bin (Windows), Aug. 2007, Wikipedia, pp. 1-3.
Rosenblum et al., "The Design and Implementation of a Log-Structured File System," Operating Systems Review SIGOPS, vol. 25, No. 5, New York, US, pp. 1-15 (May 1991).
Savill, J.: "Windows NT FAQ Single File Version—Section Backup's" Internet Publication, [Online] 2000, Retrieved from Internet: URL: <http://burks.bton.ac.uk/burks/pcinfo/osdocs/ntfaq/ntfaq_09.htm> [retrieved on Aug. 22, 2006].

* cited by examiner

SYSTEM AND METHOD FOR EXTENDED MEDIA RETENTION

CROSS-REFERENCE TO RELATED APPLICATION(S)

This application is a continuation of U.S. patent application Ser. No. 12/549,518 filed Aug. 28, 2009, which is a continuation of U.S. patent application Ser. No. 10/818,750 filed Apr. 5, 2004, now U.S. Pat. No. 7,596,586, which claims priority to U.S. Provisional Application No. 60/460,235, filed Apr. 3, 2003, each of which is hereby incorporated herein by reference in its entirety.

This application is related to the following patents and applications, each of which is hereby incorporated herein by reference in its entirety:

- U.S. Pat. No. 6,418,478, titled PIPELINED HIGH SPEED DATA TRANSFER MECHANISM, issued Jul. 9, 2002;
- U.S. Pat. No. 7,035,880, titled MODULAR BACKUP AND RETRIEVAL SYSTEM USED IN CONJUNCTION WITH A STORAGE AREA NETWORK, issued Apr. 25, 2006;
- U.S. Pat. No. 6,542,972, titled LOGICAL VIEW AND ACCESS TO PHYSICAL STORAGE IN MODULAR DATA AND STORAGE MANAGEMENT SYSTEM, issued Apr. 1, 2003;
- Application Ser. No. 60/409,183, titled DYNAMIC STORAGE DEVICE POOLING IN A COMPUTER SYSTEM, filed Sep. 9, 2002;
- U.S. Pat. No. 7,287,047, titled SELECTIVE DATA REPLICATION SYSTEM AND METHOD, issued Oct. 23, 2007; and
- Application Ser. No. 60/460,234, titled SYSTEM AND METHOD FOR PERFORMING STORAGE OPERATIONS IN A COMPUTER NETWORK, filed Apr. 3, 2003.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND

The invention disclosed herein relates generally to performing storage operations on electronic data in a computer network. More particularly, the present invention relates to systems and methods for conserving removable media usage in a storage network.

Current storage management systems perform many different types of storage operations including backup operations, restore operations, and archive operations. For example, during a backup operation, data stored on a client computer or other system is communicated via a network or other communication means to a storage device such as a tape drive, optical library, Redundant Arrays of Inexpensive Disks (RAID), CD-ROM jukebox, or other device. Clients are backed up periodically, and a number of different systems and methods exist for backing up client data.

For example, rather than backup all of the data on a client every time a backup is performed (also known as a full backup), incremental backups are sometimes performed copying only those blocks of data on the client which have changed since a prior backup. Thus, a system might initially make a full backup of a client and then only make incremental backups for a given period until the next full backup is scheduled.

One advantage of incremental backups is reduced storage media usage. For example, if a full backup utilizes one entire tape, then performing a daily full backup will consume approximately 30 tapes in a month. If a daily incremental backup only consumes ⅙ of a tape, however, and full backups are only performed once per week between incremental backups, then only about 8 tapes would be required—a savings of 22 tapes. Thus, incremental backups are a widely used form of backing up client data in current storage management systems.

Once the data has been backed up, however, even with incremental backups, it is not generally retained indefinitely since this would, among other things, use an extremely high number of tapes or other storage media over time. Instead, aging rules are often applied and backed up data is frequently deleted or moved to other media after a specified period of time. For example, data might be backed up daily for a month, then only monthly copies kept for a year, and then only yearly copies kept for 7 years until the data is eventually deleted.

When data is aged, the backed up data is often copied from one set of storage media to another set of media using a variety of techniques. The original tapes which stored the original backed up data (the primary copy) may then be returned to a "scratch pool" of available media for reuse. For example, one common technique used to copy backup data and other data is to perform an auxiliary copy. An auxiliary copy generally copies data from one set of media, such as a tape set storing full and incremental backups for given time period, to another set of media generally using a network pathway, such as a storage area network or other network, dedicated to performing storage operations. The tape set or other media which stored the original incremental backups (or possibly all data copied by the auxiliary copy) is then returned to the scratch pool for reuse.

One drawback with aging and copying backup copies of data is that the additional copies require additional sets of media. Thus, for example, three additional tapes are required to perform an auxiliary copy of a backup copy containing a full backup on one tape and incremental backups on two additional tapes—the three original tapes are copied to three additional tapes. One possible solution is to perform a selective auxiliary copy which copies only the full backup, but even this method requires at least one tape in addition to the tapes used for storage of data on the primary backup copy.

There is thus a need for systems and methods which reduce removable media usage during aging operations and other operations in storage management systems.

SUMMARY

In some embodiments, the present invention provides systems and methods for extending media retention.

In one embodiment, the invention provides a method for extending storage media retention, the storage media including a data set including a plurality of data elements. The method includes obtaining a set of aging preferences. The method further includes evaluating each of the data elements against the aging preferences to determine whether each of the data elements satisfies the aging preferences. The method further includes aging each of the data elements which is determined to satisfy the aging preferences.

In another embodiment, the invention provides a method for extending storage media retention, the storage media including a plurality of storage elements including a data set. The method includes obtaining a set of aging preferences. The method further includes evaluating data stored on each of the storage elements against the aging preferences to determine whether data on each of the storage elements is to be aged. The method further includes, for each storage element containing only data to be aged, returning the storage element to a scratch pool for reuse.

In another embodiment, the invention provides a method for extending storage media retention, the storage media storing a data set including a plurality of data elements. The method includes obtaining a set of aging preferences. The method further includes evaluating, from an index, index data relating to each of the data elements against the aging preferences to determine whether each of the data elements satisfies the aging preferences. The method further includes aging each of the data elements which are determined to satisfy the aging preferences by deleting data in the index associated with data elements to be aged.

In another embodiment, the invention provides a system for extending retention of storage media. The system includes a storage device and a processor. The processor is for obtaining a set of aging preferences; evaluating, from an index, index data relating to each of a set of data elements stored in the storage device against the aging preferences to determine whether each of the data elements satisfies the aging preferences; and aging each of the data elements which is determined to satisfy the aging preferences by deleting, from the index, index data associated with data elements to be aged.

In another embodiment, the invention provides a system for extending retention of storage media. The system includes one or more storage managers with access to aging preferences. The system further includes a storage device storing data elements of a data set. The system further includes one or more media agents, communicatively coupled to the storage manager and the storage device, and including one or more indices, the indices containing information associated with the data elements. The one or more media agents cause evaluation of data from the indices relating to each of the data elements against the aging preferences to determine whether each of the data elements satisfies the aging preferences, and cause the storage device to age each of the data elements which is determined to satisfy the aging preferences.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

Figure 1:
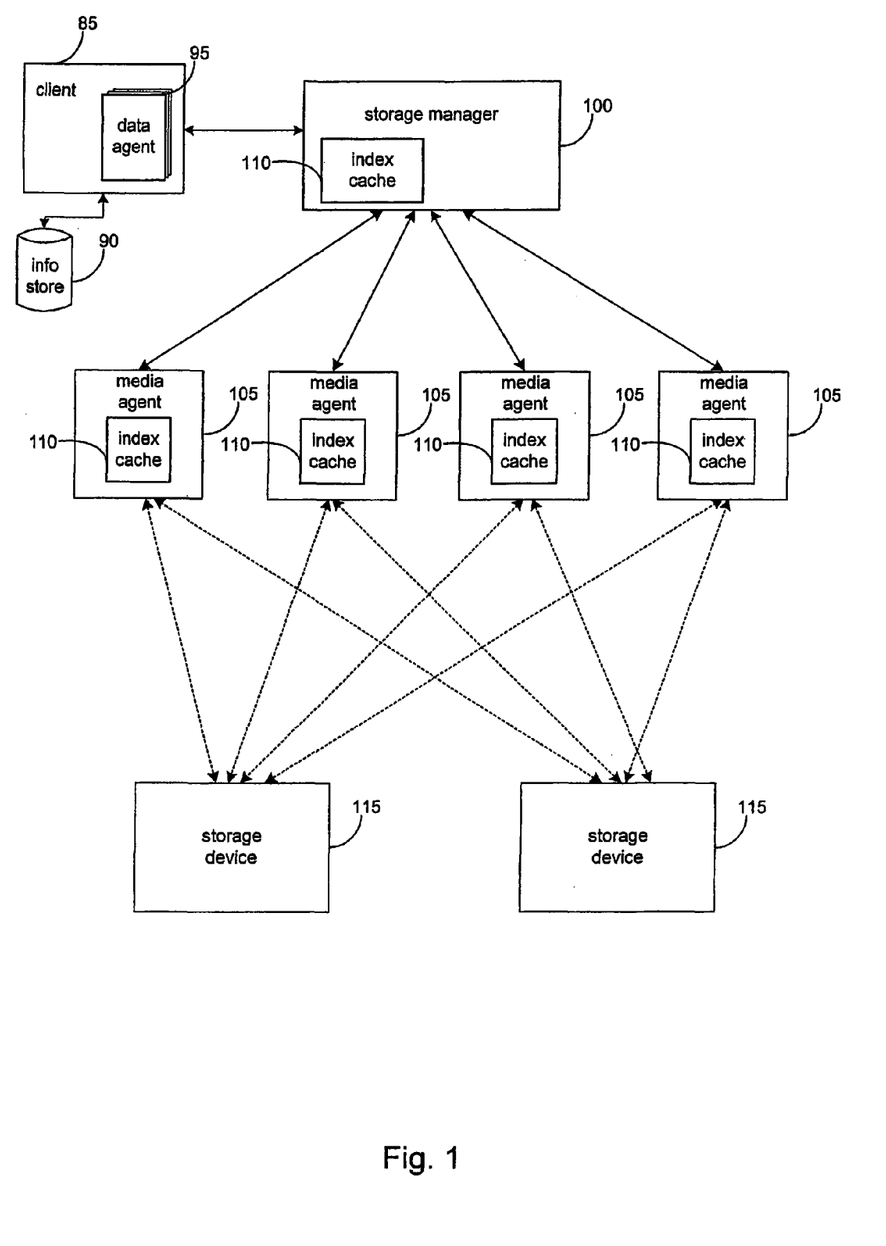
FIG. 1 is a block diagram of a network architecture for a system to perform storage operations on electronic data in a computer network according to an embodiment of the invention.
Figure 2:
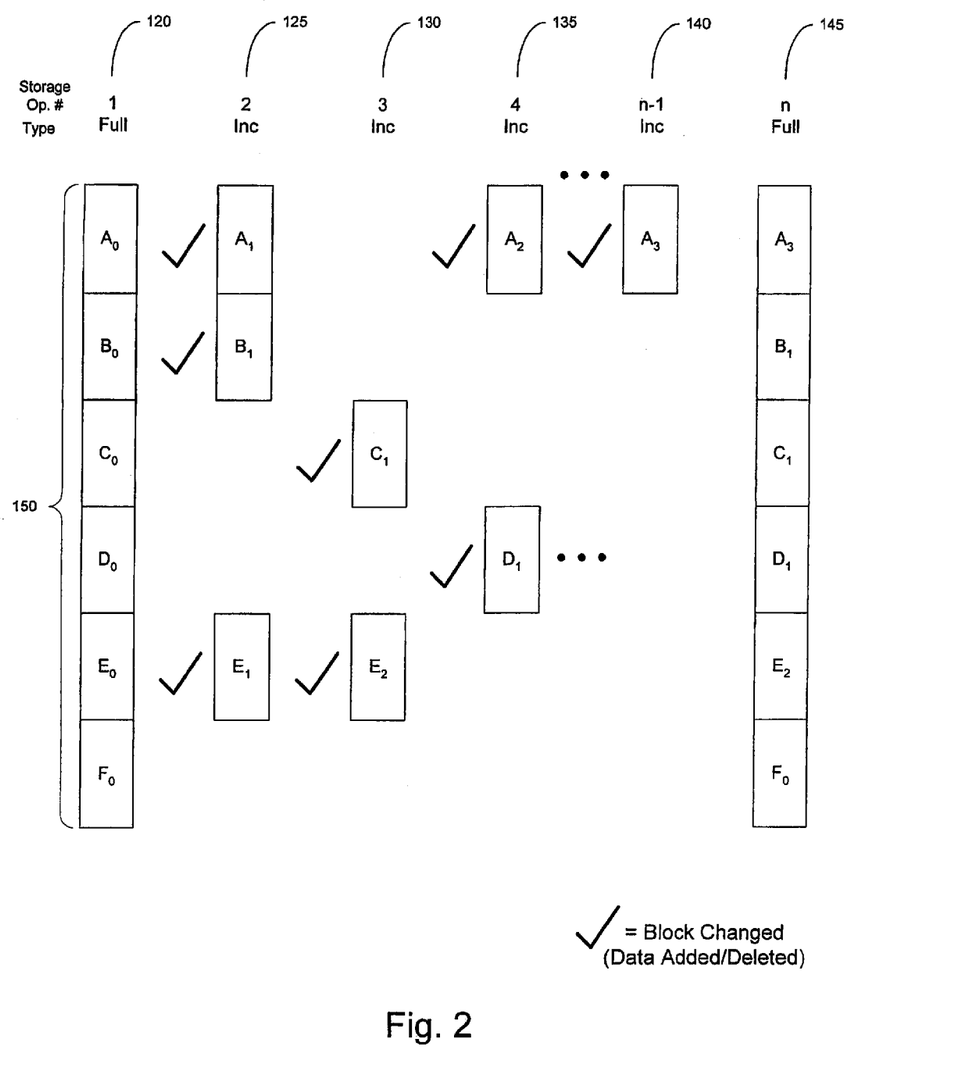
FIG. 2 is a block diagram depicting incremental block level changes occurring in an exemplary series of backups according to an embodiment of the invention.
Figure 3:
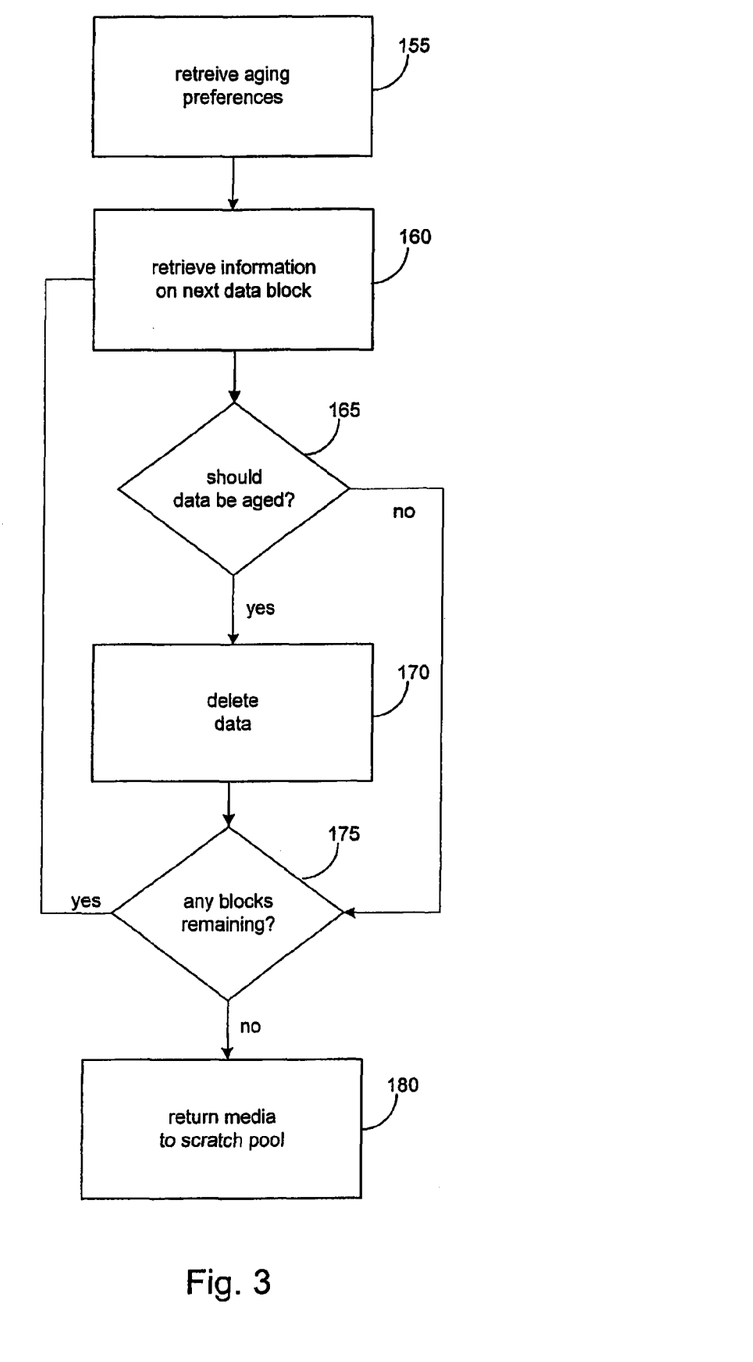
FIG. 3 is a flow chart of a method for reducing removable media usage according to an embodiment of the invention.

With reference to FIGS. 1 through 3, embodiments of the invention are presented. FIG. 1 presents a block diagram of a network architecture for a system to perform storage operations on electronic data in a computer network according to an embodiment of the invention. As shown, the system includes a storage manager 100 and one or more of the following: a client 85, an information store 90, a data agent 95, a media agent 105, an index cache 110, and a storage device 115. The system and elements thereof are exemplary of a three-tier backup system such as the CommVault Galaxy backup system, available from CommVault Systems, Inc. of Oceanport, N.J., and further described in application Ser. No. 09/610,738 which is incorporated herein by reference in its entirety.

A data agent 95 is generally a software module that is generally responsible for archiving, migrating, and recovering data of a client computer 85 stored in an information store 90 or other memory location. Each client computer 85 has at least one data agent 95 and the system can support many client computers 85. The system provides a plurality of data agents 95 each of which is intended to backup, migrate, and recover data associated with a different application. For example, different individual data agents 95 may be designed to handle Microsoft Exchange data, Lotus Notes data, Microsoft Windows 2000 file system data, Microsoft Active Directory Objects data, and other types of data known in the art.

If a client computer 85 has two or more types of data, one data agent 95 is generally required for each data type to archive, migrate, and restore the client computer 85 data. For example, to backup, migrate, and restore all of the data on a Microsoft Exchange 2000 server, the client computer 85 would use one Microsoft Exchange 2000 Mailbox data agent 95 to backup the Exchange 2000 mailboxes, one Microsoft Exchange 2000 Database data agent 95 to backup the Exchange 2000 databases, one Microsoft Exchange 2000 Public Folder data agent 95 to backup the Exchange 2000 Public Folders, and one Microsoft Windows 2000 File System data agent 95 to backup the client computer's 85 file system. These data agents 95 would be treated as four separate data agents 95 by the system even though they reside on the same client computer 85.

The storage manager 100 is generally a software module or application that coordinates and controls the system. The storage manager 100 communicates with all elements of the system including client computers 85, data agents 95, media agents 105, and storage devices 115, to initiate and manage system backups, migrations, and recoveries.

A media agent 105 is generally a software module that conducts data, as directed by the storage manager 100, between the client computer 85 and one or more storage devices 115 such as a tape library, a magnetic media storage device, an optical media storage device, or other storage device. The media agent 105 is communicatively coupled with and controls the storage device 115. For example, the media agent 105 might instruct the storage device 115 to use a robotic arm or other means to load or eject a media cartridge, and to archive, migrate, or restore application specific data. The media agent 105 generally communicates with the storage device 115 via a local bus such as a SCSI adaptor. In some embodiments, the storage device 115 is communicatively coupled to the data agent 105 via a Storage Area Network ("SAN").

Each media agent 105 maintain an index cache 110 which stores index data the system generates during backup, migration, and restore storage operations as further described herein. For example, storage operations for Microsoft Exchange data generate index data. Index data provides the system with an efficient mechanism for locating user files for backup, recovery, and archiving operations. Files backed up by a media agent 105 or associated with the media agent 105, for example, are tracked in the index cache 110 of the media agent 105 performing a backup. A media agent 105 index cache 110, for example, might track media agent associations with backed up files, media agent associations with primary copies, file names, backup dates, client information associated with backed up files, primary copy information, file sizes, file locations, pointers to file locations, and other file-related information tracked by file systems known in the art.

This index data is generally stored with the data backed up to the storage device 115, and the media agent 105 that controls the storage operation also writes an additional copy of the index data to its index cache 110. The data in the media agent 105 index cache 110 is thus readily available to the system for use in storage operations and other activities without having to be first retrieved from the storage device 115.

The storage manager 100 also maintains an index cache 110. Index data is also used to indicate logical associations between components of the system, user preferences, management tasks, and other useful data. In some embodiments, data stored in the storage manager 100 index cache 110 includes file system data regarding backed up data including media agent associations with backed up files, media agent associations with primary copies, file names, backup dates, client information associated with backed up files, primary copy information, file sizes, file locations, pointers to file locations, and other file-related information tracked by file systems known in the art. As another example, example, the storage manager 100 might use its index cache 110 to track logical associations between media agents 105 and storage devices 115.

Index caches 110 typically reside on their corresponding storage component's hard disk or other fixed storage device. Like any cache, the index cache 110 has finite capacity and the amount of index data that can be maintained directly corresponds to the size of that portion of the disk that is allocated to the index cache 110. In one embodiment, the system manages the index cache 110 on a least recently used ("LRU") basis as known in the art. When the capacity of the index cache 110 is reached, the system overwrites those files in the index cache 110 that have been least recently accessed with the new index data. In some embodiments, before data in the index cache 110 is overwritten, the data is copied to an index cache 110 copy in a storage device 115. If a recovery operation requires data that is no longer stored in the index cache 110, such as in the case of a cache miss, the system recovers the index data from the index cache 110 copy stored in the storage device 115.

In some embodiments, components of the system may reside and execute on the same computer. In some embodiments, a client computer 85 component such as a data agent 95, a media agent 105, or a storage manager 100 coordinates and directs local archiving, migration, and retrieval application functions as further described in application Ser. No. 09/610,738. This client computer 85 component can function independently or together with other similar client computer 85 components.

Turning to FIG. 2 for example, a block diagram is shown depicting incremental block level changes occurring in a series of storage operations according to an embodiment of the invention. As shown, the diagram presents a first storage operation 120, a second storage operation 125, a third storage operation 130, a fourth storage operation 135, a fifth storage operation 140, a sixth (or nth) storage operation 145, and a number of blocks 150 backed up. The first storage operation 120 is a full backup of a client 85, such as a client 85 information store 90, consisting of six blocks 150 $A_0$, $B_0$, $C_0$, $D_0$, $E_0$, and $F_0$. The first storage operation 120 stores a full backup of the blocks 150 in their original or base state. The storage manager 100 monitors the information store 90 for changes that occur to the blocks 150 since the first full backup 120 is made.

For example, the second storage operation 125 is an incremental backup of the information store 90 blocks that changed since the first storage operation 120. An incremental backup stores only copies of those elements of the data that have changed since a previous storage operation. As shown, only $A_0$, $B_0$, and $E_0$ have changed since the first storage operation 120, thus the system takes an incremental backup and stores only the changed blocks $A_1$, $B_1$, and $E_1$. The third storage operation 130 is also an incremental backup and stores copies of only those blocks that changed since the second incremental backup 125. Thus, $C_1$ and $E_2$ are stored. The fourth storage operation 135 is another incremental backup and stores copies of blocks $A_2$ and $D_1$. The fifth storage operation 140 is another incremental backup and stores a copy of block $A_2$.

Storage operations continue indefinitely until another full backup is made. The sixth storage operation 145 presents another full backup of the information store 90. The sixth storage operation 145 stores a full backup of the blocks 150 capturing the changes that occurred to all the blocks 150 since the first storage operation 120. In some embodiments, the sixth storage operation 145 is made as a synthetic storage operation. A synthetic storage operation takes a previous full backup of a volume and incorporates changes to the previous full backup recorded in one or more incremental backups to create an updated full backup without using the system resources that would be required to make a second full backup directly from the information store 90 itself. For example, here the sixth storage operation 145 is a full backup of the information store 90 created by combining the most recent change to $A_0$ stored as $A_3$ on the fifth storage operation 140, the most recent change to $B_0$ stored as $B_1$ on the second storage operation 125, the most recent change to $C_0$ stored as $C_1$ on the third storage operation 130, the most recent change to $D_0$ stored as $D_1$ on the fourth storage operation 135, the most recent change to $E_0$ stored as $E_2$ on the third storage operation 130, and $F_0$ (which has not changed) from the first full backup 140. Since the sixth storage operation 145 is a full backup of the information store 90 created via synthetic copy, the system does not need to take another full backup of the information store 90

FIG. 3 presents a flow chart of a method for reducing removable media usage according to an embodiment of the invention. The system retrieves aging preferences, step 155. For example, the storage manager retrieves and consult a storage policy which specifies, among other things, storage patterns and aging policies for backup data stored in primary copies and other copies. For example, a storage policy might specify that client data be backed up once a week with a full backup, backed up daily using incremental backups between full backups, and retained 3 weeks before aging.

The system retrieves information from the first stored file or other block of data to determine whether the file or block should be aged or retained, step 160. For example, the storage manager 100 communicates storage policy retention and aging criteria to a media agent 105. In some embodiments, the aging and retention criteria is specified according to a user preference or as otherwise directed by a user. The media agent 105 consults file system data stored in its index cache 110 regarding backed up files and other blocks of data associated with the media agent 105. For example, the media agent may consult its index cache 119 to determine the backup date of files stored on tapes or other removable media in a storage device 115 such as a tape library or CD-jukebox.

The system determines whether or not the data should be aged, step 165. If the backup date of the data is less than the retention or aging criteria specified by the storage policy or other aging criteria, then the data is retained and not aged. If the backup date of the data is greater than the retention or aging criteria specified by the storage policy or other aging criteria, however, the data is aged by the system.

The system deletes data which is past the aging deadline, step 170. The system deletes index cache 110 entries that are associated with the data and stored index caches 110 or other storage memories of the media agent 105, the storage manager 100, and other components of the system. For example, if the system determines that an incremental backup should be aged and deleted, then the system deletes the file name, pointers to the data, and other information associated with the data and stored in the index caches 110 of the media agent 105 and storage manager 100. In some embodiments, the system deletes incremental backups, full backups, synthetic backups, differential backups, and all other types of data that satisfy the aging criteria. In some embodiments, the system only deletes pointers and other index cache references to data that satisfies the aging criteria. In other embodiments, the system also writes over the data itself using low level formatting techniques or other erasure known in the art to prevent data from being recovered.

The system determines whether any files or other blocks of data remain to check against the aging criteria, step 175. If there are remaining files or other blocks of data to check, then control returns to step 160 and the next file or other block of data is evaluated. Otherwise, removable media, such as magnetic and optical removable media, which previously stored data now aged by the system is returned to the media scratch pool for reuse and the routine exits, step 180.

Thus, in some embodiments, the system may retain all data (full, incremental, and other backups) for a given period of time, and then selectively age only certain portions of the backed up data. For example, the system may retain only full backups after three weeks, and then delete incremental backups stored on a tape set holding the primary copy. The primary copy or tape set only stores full backups after three weeks, and media in the primary copy or tape set storing incremental backups longer than three weeks can thus be returned to the media scratch pool and reused once the data is aged.

Some of the embodiments of the present invention leverage existing features of the CommVault Galaxy backup system. It will be recognized by those skilled in the art, however, that the embodiments of the present invention may be applied independently of the Galaxy system.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information. Backups described herein may comprise any copies of data including snapshots, archival copies, differential copies, or other copies suitable for the purposes herein described.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

We claim:

1. A computer-implemented method, the method comprising:

creating a full backup of data elements;

creating a plurality of incremental backups of the data elements;

storing the created full backup and the created incremental backups to at least one removable storage media;

accessing the full backup and the incremental backups via the at least one removable storage media device, wherein the incremental backups comprise data elements that have been modified since creation of the full backup; and managing retention of data files stored on the at least one removable storage media device to prevent overwrites of the full backup and the incremental backups while the full backup and incremental backups are within defined periods of retention, wherein the data files comprise the full backup and the incremental backups, wherein the managing includes — accessing an aging preference for each of the data files, wherein the aging preference defines the periods of retention for each of the data files for the incremental backups and the full backup, retrieving data indicating dates of creation of the data files for the incremental backups or the full backup;

comparing the retrieved data with the accessed aging preference;

determining if the dates of creation of the data files for the incremental backups or the full backup exceed the period of retention based on the comparison; and allocating the at least one removable storage media device to a set of media devices after all of the incremental and full backups exceed the period of retention, wherein the set of media devices includes a set of removable storage media devices dedicated to be overwritten.

2. The method of claim 1, further comprising freeing a portion of storage media, previously used to store the data elements, for other storage usage.

3. The method of claim 1, further comprising retrieving and consulting a storage policy that specifies storage patterns and aging policies for back up data stored in primary copies and other copies.

4. The method of claim 1, further comprising deleting pointers or index references associated with the data files.

5. The method of claim 1, further comprising:

deleting the data elements from a portion of the storage media.

6. The method of claim 1 wherein the managing comprises managing retention of individual blocks of data.

7. A system, comprising:
a processor;
memory coupled to the processor;
a storage component,
wherein the storage component is configured to store at least one full backup and incremental backups to at least one removable storage media device,
wherein, before the storage component stores the at least one full backup and incremental backups, the system is configured to:
create the at least one full backup with multiple data elements, and
create the incremental backups of the data elements and
wherein the incremental backups comprise data elements that have been modified after creation of the full backup;
a management component,
wherein the management component is configured to manage retention of the data files stored on the at least one removable storage media device to prevent overwrites to the at least one removable storage media device of the at least one full backup and the incremental backups while the at least one full backup and the incremental backups are within defined periods of retention,
wherein the data files comprise the at least one full backup and the incremental backups,
wherein the managing includes —
accessing an aging preference for each of the data files,
wherein the aging preference defines the periods of retention for each of the data files for the incremental backups and the full backup;
retrieving data indicating dates of creation of the data files for the incremental backup or the full backup;
comparing the retrieved data with the obtained aging preference;
determining whether the dates of creation of the data files for the incremental backups or the full backup exceeds the period of retention, based on the comparison; and
allocating the removable storage media device to a set of media devices after the dates of creation of the data files for the incremental backups and the at least one full backup exceed at least one period of retention, and
wherein the set of media devices includes a set of removable storage media devices to be overwritten.

8. The system of claim 7 wherein the management component is further configured to free a portion of storage media, previously used to store the data elements, for other storage usage.

9. The system of claim 7 wherein the management component is further configured to retrieve and consult a storage policy that specifies storage patterns and aging policies for back up data stored in primary copies and other copies.

10. The system of claim 7 wherein the management component is further configured to delete pointers or index references in the retrieved data.

11. The system of claim 7 wherein the management component is further configured to delete the data elements from a portion of the storage media.

12. A non-transitory computer-readable storage medium storing computer implementable instructions to cause a data storage system to perform a process, comprising:
creating a full backup of data elements;
creating a plurality of incremental backups of the data elements;
storing the created full backup and the created incremental backups to at least one removable storage media;
accessing the full backup and the incremental backups via at least one removable storage media device,
wherein the incremental backups comprise data elements that have been modified since creation of the full backup; and
managing retention of data files stored on the at least one removable storage media device to prevent overwrites to the at least one removable storage media device of the at least one full backup and the incremental backups while the at least one full backup and the incremental backups are within defined periods of retention,
wherein the data files comprise the full backup and the incremental backups,
wherein the managing includes —
accessing an aging preference for each of the data files,
wherein the aging preference defines the periods of retention for each of the data files for the incremental backups and the full backup,
retrieving data indicating dates of creation of the data files for the incremental backups or the full backup;
comparing the retrieved data with the accessed aging preference;
determining if the dates of creation of the of the data files for the incremental backups or the full backup exceeds the period of retention based on the comparison; and
allocating the at least one removable storage media device to a set of media devices after all of the dates of creation of the data files for the incremental and full backups exceed the period of retention,
wherein the set of media devices includes a set of removable storage media devices to be overwritten.

13. The computer-readable medium of claim 12, further comprising freeing a portion of storage media, previously used to store the data elements, for other storage usage.

14. The computer-readable medium of claim 12, further comprising retrieving and consulting a storage policy that specifies storage patterns and aging policies for back up data stored in primary copies and other copies.

15. The computer-readable medium of claim 12, further comprising deleting pointers or index references in the retrieved data.

16. The computer-readable medium of claim 12 wherein the managing comprises managing retention of individual blocks of data.

17. A system for storing and retaining data stored on storage media, the system comprising:
a processor;
memory;
means for creating a full backup of data elements;
means for creating a plurality of incremental backups of the data elements;
means for storing the created full backup and the created incremental backups to at least one removable storage media;
means for accessing the full backup and incremental backups via the at least one removable storage media device, wherein the incremental backups comprise data elements that have been modified since creation of at least one of the full backup; and means for managing retention of data files stored on the at least one removable storage media device to prevent overwrites on the at least one removable storage media device of the full backup and the incremental backups while the full backup and the incremental backups are within defined periods of retention, wherein the data files comprise the full backup and the incremental backups, wherein the means for managing includes — means for accessing an aging preference for each of the data files, wherein the aging preference defines periods of retention for each of the data files for the incremental backups and the full backup, means for retrieving data indicating dates of creation of the data files for the incremental backups or the full backup;

means for comparing the retrieved data with the accessed aging preference;

means for determining whether the incremental backups or the full backup exceed the period of retention based on the comparison; and means for allocating the at least one removable storage media device to a set of media devices after all of the dates of creation of the data files for the incremental and full backups exceed the period of retention, wherein the set of media devices includes a set of removable storage media devices to be overwritten.

18. The system of claim 17, further comprising means for freeing a portion of storage media, previously used to store the data elements, for other storage usage.

19. The system of claim 17, further comprising means for retrieving and consulting a storage policy that specifies storage patterns and aging policies for back up data stored in primary copies and other copies.

20. The system of claim 17 wherein the means for managing comprises means for managing retention of individual blocks of data.

* * * * *

UNITED STATES PATENT AND TRADEMARK OFFICE
CERTIFICATE OF CORRECTION

PATENT NO. : 8,463,753 B2
APPLICATION NO. : 13/532218
DATED : June 11, 2013
INVENTOR(S) : Parag Gokhale et al.

It is certified that error appears in the above-identified patent and that said Letters Patent is hereby corrected as shown below:

On Title page 3, in column 1, under "U.S. Patent Documents", line 9, after "Goodman et" insert -- al. --.

On Title page 4, in column 1, under "Other Publications", line 4, delete ""Probablility," and insert -- "probability, --, therefor.

In the Drawings:

On sheet 3 of 3, in Figure 3, Box 155, line 1, delete "retreive" and insert -- retrieve --, therefor.

In the Specification:

In column 6, line 46, after "store 90" insert -- . --.

In the Claims:

In column 10, line 32, in claim 12, after "creation of the" delete "of the".

Signed and Sealed this
Tenth Day of September, 2013

Teresa Stanek Rea
*Acting Director of the United States Patent and Trademark Office*